United States Patent [19]

Pettijohn et al.

[11] Patent Number: 5,109,085
[45] Date of Patent: Apr. 28, 1992

[54] OLEFIN POLYMERIZATION PROCESS

[75] Inventors: Ted M. Pettijohn; Henry L. Hsieh, both of Bartlesville, Okla.

[73] Assignee: Phillips Petroleum Company, Bartlesville, Okla.

[21] Appl. No.: 572,820

[22] Filed: Aug. 27, 1990

[51] Int. Cl.$^5$ ............................................. C08F 4/52
[52] U.S. Cl. ....................... 526/160; 526/127; 526/151; 526/152; 526/279; 526/348.4; 526/905; 502/102; 502/154
[58] Field of Search ............... 526/127, 152, 160, 170, 526/905, 151

[56] References Cited

U.S. PATENT DOCUMENTS

| | | | |
|---|---|---|---|
| 3,899,477 | 10/1975 | Altemore et al. | 260/94.9 B |
| 4,134,855 | 1/1979 | Candlin et al. | 526/160 X |
| 4,623,707 | 11/1986 | Bedell et al. | 526/142 |
| 4,632,912 | 12/1986 | Bedell et al. | 502/122 |
| 4,665,046 | 5/1987 | Campbell, Jr. | 502/102 |
| 4,716,257 | 12/1987 | Marks et al. | 585/275 |

OTHER PUBLICATIONS

Inorg. Chem., 20, 3267-3270 (1981), T. Don Tilley and Richard A. Andersen; 3271-3278, Patricia L. Waton, John F. Whitney, and Richard L. Harlow.

*Primary Examiner*—Fred Teskin
*Attorney, Agent, or Firm*—Edward L. Bowman

[57] ABSTRACT

A process for polymerizing olefins is disclosed which makes use of a catalyst comprising a cyclopentadienyl lanthanide halide alkali metal ether complex in combination with a cocatalyst comprising an alkali or alkaline earth metal alkyl. Preferred embodiments include the use of hydrogen during the polymerization or the use of an organoaluminum hydride as an additional cocatalyst.

20 Claims, No Drawings

OLEFIN POLYMERIZATION PROCESS

FIELD OF THE INVENTION

The present invention relates to the polymerization of olefins. In a particular aspect the present invention relates to olefin polymerization employing a catalyst system comprising a lanthanide metal containing compound.

BACKGROUND OF THE INVENTION

It is well known that olefins such as ethylene, propylene and 1-butene can be polymerized in the presence of certain metallic catalysts, particularly the reaction products of organometallic compounds and transition metal compounds, to form substantially linear polymers of relatively high molecular weight. Typically such polymerizations are carried out at relatively low temperatures and pressures.

It has been proposed to use certain organolanthanide compounds as olefin polymerization catalysts. Ballard et al in *J.C.S. Chem. Comm.*, (1978) pages 994 and 995 reported that certain alkyl bridged complexes of lanthanide metals such as $[(C_5H_5)_2ErCH_3]_2$ and $[(C_5H_4R)_2YCH_3]_2$, would polymerize ethylene. Marks and Mauermann in their U.S. Pat. No. 4,668,773 disclose that an ethylene polymerization catalyst could be obtained by reacting an anionic pentamethylcyclopentadienyl lanthanide halide lithium ether complex with a special type of lithium alkyl and then reacting that product with hydrogen to yield a catalyst of the general $[(C_5Me_5)_3LnH]_2$. The dimeric hydrido complex of Marks et al was reported to have activities as high as 3,000 grams of polyethylene per millimole Nd, however, the data also indicates that the catalyst had a very short lifetime (on the order of seconds to minutes). The overall productivity of the catalyst was thus quite low. The synthesis of this catalyst system was also very complex. It was a multi-step procedure that had to be carried out under rigorously anaerobic conditions. The procedure also requires the use of exotic organolithium compounds which contain no beta hydrogen or beta alkyl groups.

An object of the present invention is to provide a process under which anionic organolanthanide complexes of the type described in the Marks et al patent could be made directly active to olefin polymerization by using simple metal alkyls.

Other aspects, objects, and advantages of the present invention will be apparent from the following disclosure.

SUMMARY OF THE INVENTION

In accordance with the present invention there is provided a process for polymerizing an olefin comprising contacting the olefin under suitable reaction conditions with a catalytic amount of a catalyst system comprising (1) a catalyst having a formula $Cp_nMX_{4-n} \cdot M'L_x$ and a cocatalyst comprising an alkali or alkaline earth metal alkyl. In a particularly preferred embodiment the polymerization is conducted in the presence of hydrogen.

DETAILED DESCRIPTION OF THE INVENTION

The cyclopentadienyl lanthanide compounds employed in the present invention are selected from compounds of the formula $Cp_nMX_{4-n} \cdot M'L_x$, wherein Cp is cyclopentadienyl or cyclopentadienyl substituted with an alkyl or alkyl silyl radical, M is a metal having an atomic number in the range of 58 to 71, M' is an alkali metal, L is a suitable electron donor ligand, X is a halogen, n is 1 or 2, and x is a number in the range of 1 to 3 and corresponding to the value needed to form a stable complex.

Some specific examples of the Cp groups include cyclopentadienyl, ethyl cyclopentadienyl, trimethylcyclopentadienyl, trimethylsilylcyclopentadienyl, and pentamethylcyclopentadienyl. Generally, the substituents of the substituted cyclopentadienyl would each have 1 to 4 carbon atoms.

The halogens, X, of the above formula are preferably chloride or iodide.

M' is an alkali metal. Generally the alkali metal would be selected from lithium, sodium and potassium.

The L of the above formula can be selected from any suitable electron donor ligand. Some specific examples of electron donor ligands include tetrahydrofuran, hereinafter referred to as THF, diethyl ether, and N,N,N',N',-tetramethylethylene diamine (tmed). Some specific examples of such complexes include
$(Me_5C_5)_2YbCl_2 \cdot Li(Et_2O)_2$,
$(C_5H_4SiCH_3Ph_2)_2YbCl_2 \cdot Li(Et_2O)_2$,
$[C_5H_4Si(CH_3)_2]_2YbCl_2 \cdot Li(Et_2O)_2$,
$(Me_5C_5)NdCl_2 \cdot Li(Et_2O)_2$,
$(Me_5C_5)YbCl_3 \cdot Li(THF)$,
$(Me_5C_5)_2LuCl_2 \cdot Li(Et_2O)_2$,
$(Me_5C_5)LuCl_3 \cdot Li(Et_2O)$,
$(Me_5C_5)_2YbI_2 \cdot Li(Et_2O)_2$,
$(Me_5C_5)YbI_3 \cdot Li(Et_2O)_2$,
$(Me_5C_5)_2YbCl_2 \cdot Li(THF)_{2-3}$,
$(Me_5C_5)_2YbCl_2 \cdot Li(tmed)$,
$(Me_5C_5)_2SmCl_2 \cdot Li(tmed)$,
$(Me_5C_5)_2NdCl_2 \cdot Li(tmed)_2$,
$(Me_5C_5)_2YbCl_2 \cdot Na(Et_2O)_2$,
$(Me_5C_5)NdCl_3 \cdot Na(Et_2O)_2$, and
$(Me_5C_5)_2NdCl_2 \cdot Na(Et_2O)$.

Any suitable alkali or alkaline earth metal alkyl can be employed as the cocatalyst for the catalyst system. Generally alkyllithiums are preferred. Generally the alkyl radicals of the cocatalyst would contain 1 to 12 carbon atoms. Some specific examples of such cocatalysts include n-butyl sodium, n-butyl lithium, secondary butyl lithium, tertiary butyl lithium, n-butyl potassium, diethyl magnesium, di-n-butyl magnesium, and the like.

The anionic organolanthanide complexes can be prepared using techniques known in the art. In view of the fact that organolanthanides in general are extremely air and moisture sensitive, all manipulations are preferably conducted under anaerobic conditions using standard Schlenk techniques.

The ratio of the catalyst to the cocatalyst can vary over a wide range depending upon the particular compounds employed and the particular results desired. As a general rule the molar ratio of a metal and the cocatalyst to the metal in the organolanthanide compound will be in the range of from about 0.5:1 to about 200:1, more commonly about 1:1 to about 100:1.

The present invention is particularly effective in polymerizing ethylene. It is also, however, within the scope of the present invention to employ other olefinic monomers. Examples of either such monomers include propylene, 4-methyl-1-pentene, butadiene, styrene, propylene, and allyl trimethylsilane.

The polymerization can be carried out in either a solution or a slurry type process. Conventional polymerization diluents can be used in combination with the catalyst. Some typical examples of such diluents include aromatic and aliphatic hydrocarbons such as toluene, xylene, hexane, isobutane, heptane, ethyl benzene, decylene, cyclohexane, mineral spirits, and the like.

Hydrogen, when employed, can vary over a wide range, again depending upon the particular compounds employed as the catalyst and the particular results desired. Typically, the hydrogen would be employed at a pressure in the range of from about 10 to about 200 psi, more preferably about 15 to about 100 psi.

The temperature employed in the polymerization can also vary over a wide range depending upon the particular results desired. Generally, the polymerization temperature would be within the range of about 0° C. to about 170° C., more preferably about 15° C. to about 100° C.

In one preferred embodiment of the present invention the polymerization is carried out in the additional presence of a hydrocarbyl aluminum compound of the formula $R_2AlZ$, wherein Z is hydrogen or halogen, or an alkyl group and R is an alkyl group. The preferred hydrocarbyl aluminum hydrides are alkyl aluminum compounds, for example, diethyl aluminum hydride, di-n-butyl aluminum hydride, di-isobutyl aluminum hydride, and dimethyl aluminum hydride. Other examples include triethylaluminum, ethylaluminum dichloride, and diethyl aluminum chloride.

A further understanding of the present invention and its various aspects and advantages will be provided by the following examples. In the following examples unless indicated otherwise the polymerization reactions were performed in a one liter, stirred autoclave. Prior to the reactions, the autoclave was washed thoroughly with dry cyclohexane and purged with nitrogen. The liquid reaction diluent was added to the reactor and the desired temperature obtained and maintained. The catalyst was charged under a counter flow of ethylene using one of two procedures depending upon the ratio of the metal alkyl to the lanthanide metal compound. At metal alkyl/lanthanide ratios of 1 or 2, the metal alkyl was prereacted with the blue hydrocarbon solution of the lanthanide metal compound outside the reactor, then the resulting green solution was charged to the reactor. At higher metal alkyl to lanthanide ratios, the two components were added to the reactor separately with the metal alkyl being added first. The reactor in either case was sealed and ethylene pressure increased. At the end of the reaction solvent and ethylene were rapidly vented. The solid polymer was then collected and dried.

EXAMPLE I

A series of polymerization runs were carried out employing the complex $(C_5Me_5)_2NdCl_2 \cdot Li(OEt_2)_2$ as the catalyst. Various cocatalysts were tested.

The results and variables are summarized in Table 1.

TABLE 1

| Nd (mmol) | $R_nM$ | M/Nd | $H_2^{(b)}$ (psig) | Temp. (°C.) | Time (min) | Activity [gPE/ (gNd.h)] | MI | HLMI | Density (g/mL) |
|---|---|---|---|---|---|---|---|---|---|
| 0.047 | n-BuLi | 1 | — | 50 | 5 | 20,000 | 0 | 0.26 | 0.9485 |
| 0.041 | s-BuLi | 1 | — | 50 | 5 | 24,000 | 0 | 0.51 | 0.9452 |
| 0.039 | t-BuLi | 1 | — | 50 | 5 | 7,600 | — | — | — |
| 0.047 | n-BuLi | 1 | — | 50 | 15 | 12,000 | 0 | 0.51 | 0.9484 |
| 0.020 | n-BuLi | 1 | — | 50 | 60 | 5,000 | 0 | 0 | 0.9265 |
| 0.089 | n-BuLi | 1 | 20 | 50 | 5 | 44,000 | 690 | — | 0.9758 |
| 0.095 | n-BuLi | 30 | — | 50 | 30 | 2,400 | 0 | 0.08 | 0.9565 |
| 0.033 | n-BuLi | 30 | ca. 2 | 50 | 30 | 12,000 | 440 | — | 0.9793 |
| 0.039 | $Bu_2Mg$ | 1 | — | 50 | 5 | 17,000 | 0 | 0.05 | 0.9405 |
| 0.039 | $Bu_2Mg$ | 1 | — | 70 | 5 | 35,000 | 0 | 0.35 | 0.9401 |
| 0.046 | $Bu_2Mg$ | 1 | — | 50 | 60 | 6,200 | 0 | 0.03 | 0.9346 |
| 0.037 | $Bu_2Mg$ | 20 | — | 50 | 5 | 35,000 | 3.2 | 90.5 | 0.9707 |
| 0.019 | $Bu_2Mg$ | 20 | — | 50 | 15 | 39,000 | 1.7 | 66.2 | 0.9628 |
| 0.006 | $Bu_2Mg$ | 20 | — | 50 | 60 | 47,000 | 0.01 | 1.62 | 0.9540 |
| 0.006 | $Bu_2Mg$ | 96 | — | 50 | 30 | 36,000 | 0.14 | 5.00 | 0.9513 |
| 0.031 | $Et_3Al$ | 1 | — | 50 | 30 | 0 | — | — | — |
| 0.059 | $Et_3Al$ | 10 | — | 50 | 30 | 0 | — | — | — |
| 0.051 | n-BuLi $Et_3Al$ (1:1) | 2 | — | 50 | 5 | 20,000 | 0.03 | 2.55 | 0.9561 |
| 0.022 | n-BuLi $Et_2AlH$ (1:1) | 2 | — | 50 | 15 | 41,000 | 0 | 0.09 | 0.9386 |

Table 1 demonstrates that alkyllithium or dialkylmagnesium compounds are capable of producing useful catalyst systems with the neodymium complex. Catalyst activities as high as 47,000 were demonstrated. The presence of hydrogen increases the overall productivity of the catalyst. The density of the polymers varied in an inverse relationship to the molecular weight of the polymers from about 0.93 to about 0.98 g/ml. Triethylaluminum alone does not activate the lanthanide complex. The catalyst can, however, be used in the presence of small amounts of triethylaluminum. The last run in the table demonstrates that a combination of diethylaluminum hydride and the n-butyl lithium results in a higher activity than the use of n-butyl lithium as the sole co-catalyst.

EXAMPLE II

Another series of runs were carried out using the same neodymium complex as the catalyst and di-n-butylmagnesium has the co-catalyst. In these runs 4-methyl-1-pentene was used in combination with ethylene. The polymerization variables and results are summarized in Table 2.

TABLE 2

| Nd (mmol) | Mg/Nd | Temp. (°C.) | Time (min) | Activity [gPE/(gNd.h)] | MI | HLMI | Density (g/mL) |
|---|---|---|---|---|---|---|---|
| 0.037[a] | 20 | 50 | 60 | TRACE | — | — | — |
| 0.039[b] | 19 | 50 | 60 | 20,000 | 0.002 | 0.76 | 0.9520 |
| 0.034[b] | 20 | 80 | 30 | 29,000 | 0.09 | 7.22 | 0.9595 |

[a]Conditions: 1 L autoclave, 500 mL 4-methyl-1-pentene, no ethylene
[b]Conditions: 1 L autoclave, 500 mL 4-methyl-1-pentene, 525 psig total pressure These results indicate that the ethylene polymerization predominates the polymerization of the other monomer. High density polyethylene was obtained even though the other monomer was employed. Ordinarily, with transition metal catalysts, one would have expected the density to be reduced by the presence of the other olefin monomer.

That which is claimed is:

1. A process for polymerizing an olefin comprising contacting said olefin under suitable reaction conditions with a catalytic amount of a catalyst system comprising a catalyst having the formula $Cp_nMX_{4-n} \cdot M'L_x$ and a cocatalyst comprising an alkali or alkaline earth metal alkyl, wherein Cp is cyclopentadienyl or cyclopentadienyl substituted with an alkyl or alky silyl radical, M is a metal having an atomic number in the range of 58 to 71, M' is an alkali metal, L is a suitable electron donor ligand, X is a halogen, n is 1 or 2, and x is a number in the range of 1 to 3 and corresponding to the value needed to form a stable complex.

2. A process according to claim 1 wherein said cocatalyst is selected from alkali metal alkyls having β-hydrogen or β-alkyl groups.

3. A process according to claim 2 wherein Cp is pentamethylcyclopentadienyl.

4. A process according to claim 2 wherein L is selected from THF, diethylether, and N,N,N',N'-tetramethylethylene diamine.

5. A process according to claim 4 wherein M is selected from Nd, Sm, Yb.

6. A process according to claim 4 wherein said catalyst is selected from complexes of the formula
$(Me_5C_5)_2YbCl_2 \cdot Li(Et_2O)_2$,
$(C_5H_4SiCH_3Ph_2)_2YbCl_2 \cdot Li(Et_2O)_2$,
$[C_5H_4Si(CH_3)_2]_2YbCl_2 \cdot Li(Et_2O)_2$,
$(Me_5C_5)_2NdCl_2 \cdot Li(Et_2O)_2$,
$(Me_5C_5)YbCl_3 \cdot Li(THF)$,
$(Me_5C_5)_2LuCl_2 \cdot (Et_2O)_2$
$(Me_5C_5)_2LuCl_3 \cdot Li(Et_2O)$,
$(Me_5C_5)_2YbI_2 \cdot Li(Et_2O)_2$,
$(Me_5C_5)YbI_3 \cdot Li(Et_2O)_2$
$(Me_5C_5)_2YbCl_2 \cdot Li(THF)_{2-3}$,
$(Me_5C_5)_2YbCl_2 \cdot Li(tmed)$,
$(Me_5C_5)_2SmCl_2 \cdot Li(tmed)$,
$(Me_5C_5)_2NdCl_2 \cdot Li(tmed)_2$,
$(Me_5C_5)_2YbCl_2 \cdot Na(Et_2O)_2$,
$(Me_5C_5)NdCl_3 \cdot Na(Et_2O)_2$, and
$(Me_5C_5)_2NdCl_2 \cdot Na(Et_2O)$.

7. A process according to claim 6 wherein said cocatalyst comprises a butyl lithium.

8. A process according to claim 7 wherein said polymerization is conducted in the presence of hydrogen in an amount sufficient to increase the active life of the catalyst system.

9. A process according to claim 8 wherein said catalyst consists essentially of a complex of the formula $(Me_5C_5)_2NdCl_2 \cdot Li(Et_2O)_2$ and said cocatalyst consists essentially of butyl lithium.

10. A process according to claim 7 wherein said catalyst consists essentially of a complex of the formula $(Me_5C_5)_2NdCl_2 \cdot Li(Et_2O)_2$ and said cocatalyst consists essentially of butyl lithium.

11. A process according to claim 5 wherein said catalyst consists essentially of a complex of the formula $(Me_5C_5)_2NdCl_2 \cdot Li(Et_2O)_2$.

12. A process according to claim 11 wherein said cocatalyst consists essentially of dibutyl magnesium.

13. A process according to claim 12 wherein the molar ratio of Mg to Nd is at least about 20:1.

14. A process according to claim 11 wherein said cocatalyst consists essentially of n-butyl lithium.

15. A process according to claim 14 wherein the molar ratio of Li to Nd is about 1:1.

16. A process according to claim 11 wherein said cocatalyst consists essentially of a mixture of diethylaluminum hydride and butyl lithium.

17. A process according to claim 5 wherein said polymerization is conducted in the presence of hydrogen in an amount sufficient to increase the active life of the catalyst system.

18. A process according to claim 1 wherein said polymerization is conducted in the presence of hydrogen in an amount sufficient to increase the active life of the catalyst system.

19. A process according to claim 11 wherein said polymerization is conducted in the presence of hydrogen in an amount sufficient to increase the active life of the catalyst system.

20. A process according to claim 2 wherein said polymerization is conducted in the presence of hydrogen in an amount sufficient to increase the active life of the catalyst system.

* * * * *